Oct. 11, 1938.   R. T. MOBLEY   2,132,747
PIPE GRIPPING MEANS FOR ROTARY APPARATUS
Filed May 12, 1938   2 Sheets-Sheet 1
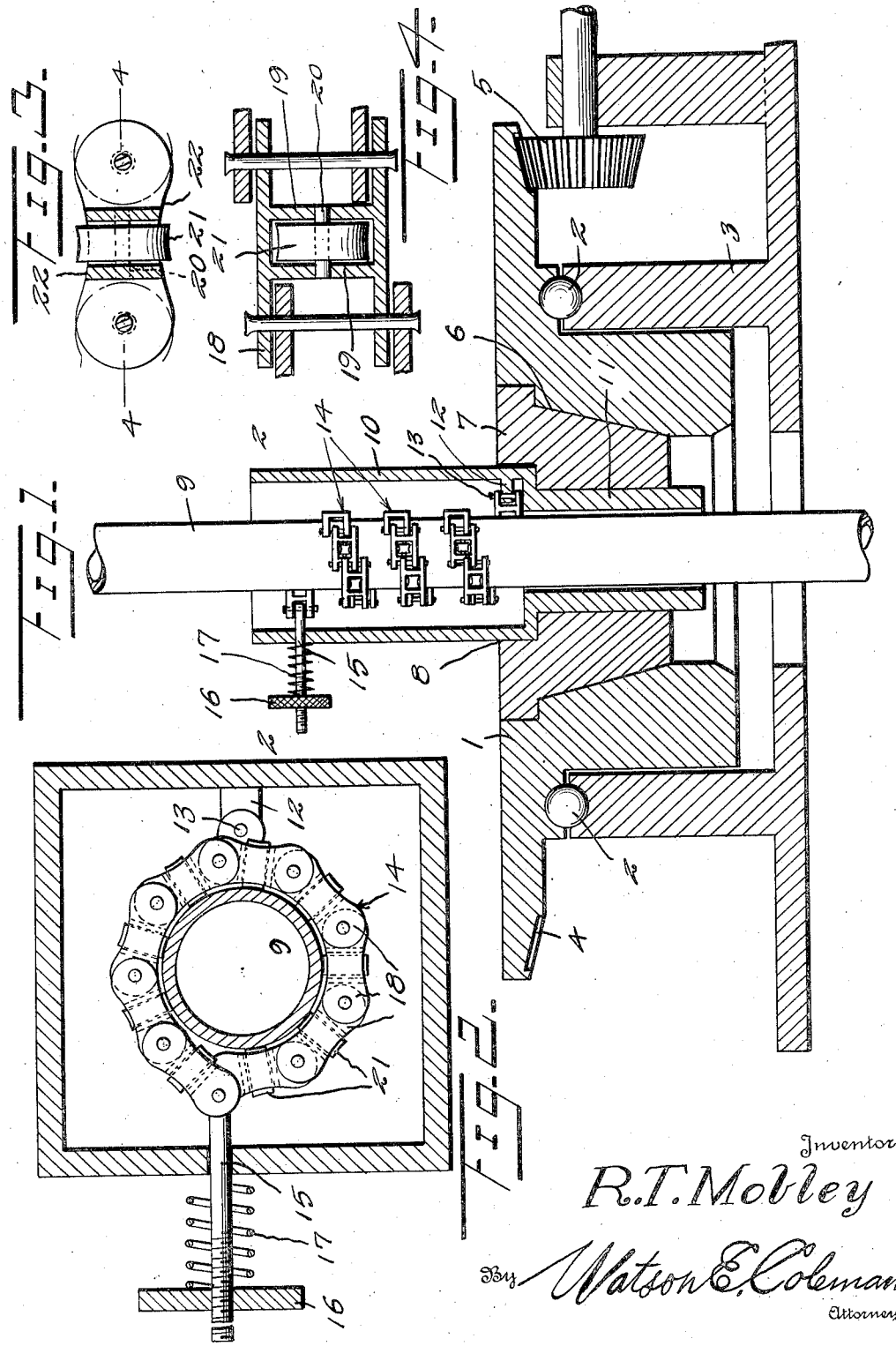
Inventor
R. T. Mobley
By Watson E. Coleman
Attorney Oct. 11, 1938. R. T. MOBLEY 2,132,747
PIPE GRIPPING MEANS FOR ROTARY APPARATUS
Filed May 12, 1938 2 Sheets-Sheet 2
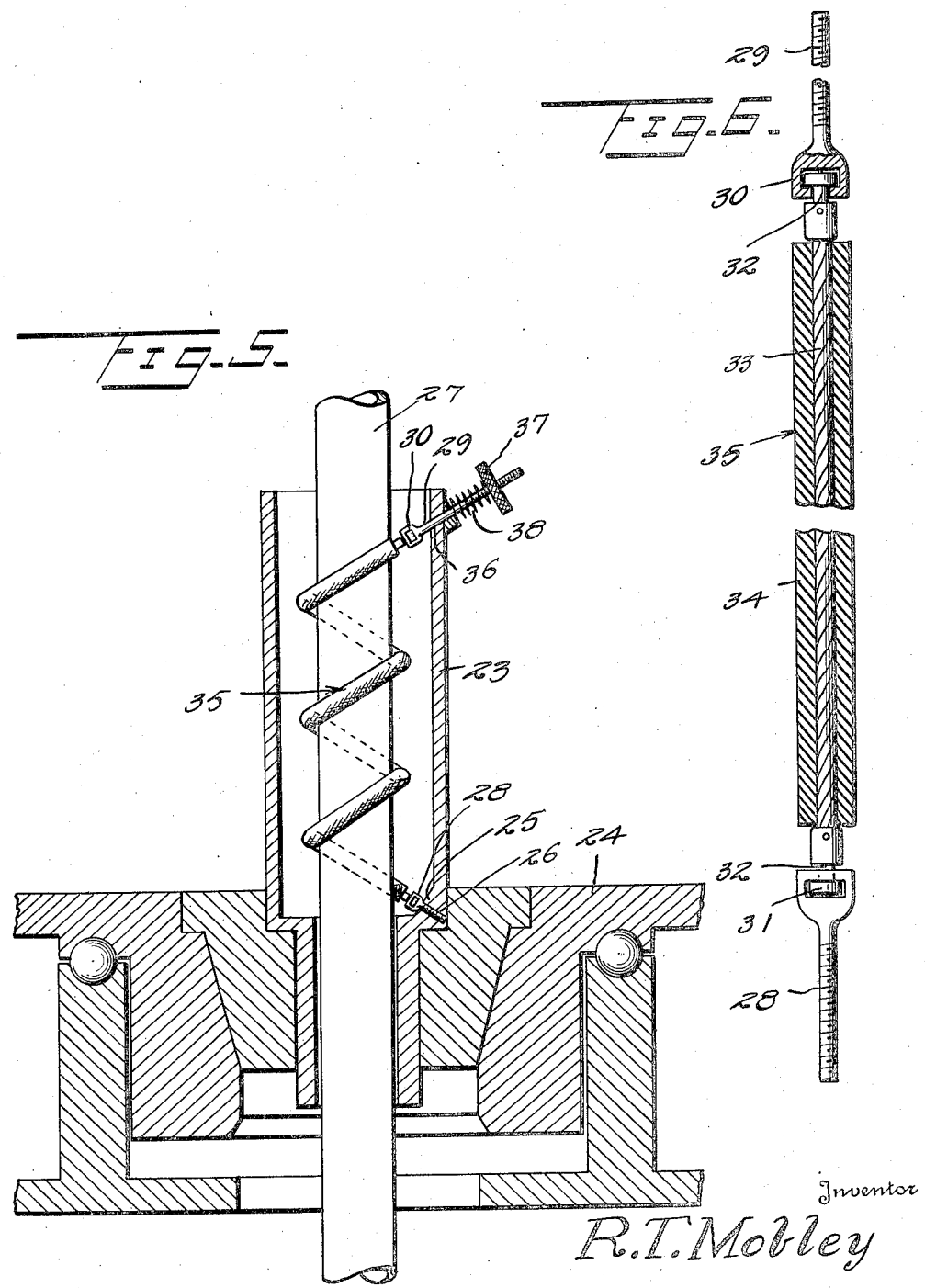
Inventor
R.T.Mobley
By Watson E. Coleman
Attorney Patented Oct. 11, 1938

2,132,747

UNITED STATES PATENT OFFICE 2,132,747

PIPE GRIPPING MEANS FOR ROTARY APPARATUS

R. T. Mobley, Midland, Tex.

Application May 12, 1938, Serial No. 207,629

9 Claims. (Cl. 255—23)

This invention relates to the class of well drilling and pertains particularly to the method of drilling which involves the rotation of the drill pipe as the same is sunk into the earth.

The present invention has for its primary object the provision of a novel drill stem clamping means whereby the drill stem or pipe will be firmly held while the pipe is being turned with the rotary table but will be permitted smooth and easy longitudinal movement when the same is necessary for the lowering of the pipe.

A further object of the invention is to provide in a rotary drilling machine, an improved pipe or stem gripping mechanism which is wrapped spirally around the pipe and which prevents relative axial movement of the pipe and the rotary table but which allows the pipe free longitudinal movement so that the lowering of the pipe during the drilling operation may be carried on continuously.

A still further object of the invention is to provide in a well drilling apparatus of the character herein set forth, an improved pipe clamping chain adapted to be wrapped about the drill pipe and including rotary means having contact with the pipe for rotation on an axis extending substantially longitudinally of the pipe to permit the pipe to move downwardly but holding the pipe against rotary movement relative to the table through which it passes.

A still further object of the invention is to provide a drill pipe or stem securing means for use in association with a rotary table, which is secured in a manner whereby the degree of gripping action or frictional contact between the securing means and the pipe or stem may be regulated.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:—

Figure 1 is a view illustrating the application of one form of pipe gripping or clamping means embodying the present invention, the same being shown in association with a rotary table and a flush joint drive guard.

Figure 2 is a sectional view on an enlarged scale taken on the line 2—2 of Figure 1.

Figure 3 is a view in longitudinal section through a link of the chain structure shown in Figure 1.

Figure 4 is a sectional view taken on the line 4—4 of Figure 3.

Figure 5 is a view illustrating a modified form of the pipe gripping device.

Figure 6 is a view of the modified pipe gripper in longitudinal section.

Referring now more particularly to the drawings, reference being had especially first to Figures 1 to 4 inclusive, there is indicated by the numeral 1 a rotating table of the character commonly employed in the drilling of oil, water and gas wells by what is known as the rotary process. Such a table is supported upon suitable bearings 2 in a base structure 3 and its periphery is provided with gear teeth 4 for engagement by a driving gear pinion 5. In the center of the table 1 is an opening 6 of polygonal outline in which is fitted a drive bushing 7 having a similar exterior contour so as to form a non-moving union with the table, this bushing having a central opening 8 therethrough through which passes the well drill pipe or stem, here indicated generally by the numeral 9.

The numeral 10 designates a flush joint drive guard, the lower portion of which is reduced, as indicated at 11, to fit into the central bore of the bushing 7.

In carrying out the present invention there is provided within the guard 10 which, as shown, is of an interior diameter materially greater than the overall diameter of the pipe 9, above the table 1, an apertured stud 12 which is integral with the wall of the guard and disposed in the lower part thereof. This stud has connected therewith by means of a pin 13, an end of a clamp chain of novel construction and indicated as a whole by the numeral 14, the other end of this chain after being wound spirally about the pipe 9, being joined adjacent the top of the guard 10 with an end of a threaded bar 15 which passes through a suitable aperture in a wall of the guard 10 and has a spring tensioning nut 16 threaded thereon adjacent its outer end. The spring referred to is indicated by the numeral 17 and surrounds the bar 15 and is interposed between the nut 16 and the adjacent wall of the guard 10.

The chain 14 is made up of a series of link units each comprising two spaced parallel side bars 18 which are permanently joined together by the cross bars 19, which cross bars are in spaced parallel relation and adjacent transverse centers of the side bars 18 so that such side bars extend a considerable distance beyond the cross bars 19, as shown in Figure 4. Between the cross bars 19 of each link is connected a pivot pin 20 on which is mounted a peripherally grooved roller 21, the pin 20 being upon the longitudinal center of the link or parallel with the side bars 18 and midway between the same. As shown, each of the link bars has its longitudinal edges of concave form, each concavity being indicated at 22 so that the grooved periphery of the roller 21 extends beyond the longitudinal edges of the side bars of the link and the curvature of the roller groove as well as that of a concave edge of the adjacent link is the same as the curvature of the pipe 9 against which the roller engages.

The links of the chain 14 are joined together by overlapping the ends of the side bars 18 of one link with the ends of the side bars of another link so that both bars of one link are offset laterally with respect to the bars of a link at one end thereof, while the link at the opposite end is also offset laterally so that when a number of links are joined together in this manner the offsetting will be carried out constantly in the same direction and thus arrange the links substantially in stepped relation as is clearly shown in Figure 1. When an end of one end link of the chain is joined by the pin 13 with the stud 12, the chain may be carried around the pipe in several spirals and have its other end brought to position for connection with the end of the bar 15 and in this way with the side bars 18 of the links all extending perpendicularly to the length of the pipe 9, it will be seen that all of the rollers of the chain will have their curved faces concentric with the wall of the pipe.

The spring 17 will constantly operate to pull the upper end of the chain 14 tight around the pipe and thus a sufficiently strong frictional engagement will be maintained between the peripheries of the rollers and the pipe to prevent the pipe from turning independently of the guard and the other parts of the drilling mechanism. However, it will be readily apparent that by reason of the engagement of the pipe with the encircling rollers, the pipe may be readily shifted longitudinally during the well drilling operation. It will, of course, be readily understood that the tension of the gripping action of the chain on the pipe may be increased or decreased by turning the nut 16 to increase or lighten the tension of the spring.

In Figures 5 and 6 a slightly modified form of the invention is disclosed, although the principle of operation is the same. In the illustration of the application of this modified form, there is shown the flush joint drive guard 23 corresponding to the guard 10 of Figure 1 and supported by the rotary table 24. In the lower part of the guard 23 there is fixed a body 25 in which is a threaded passage 26. This passage opens upwardly and obliquely of the pipe 27 which passes through the guard and which is maintained in position by the mechanism hereinafter described.

In this modified form of the invention, there are provided the two screws 28 and 29 each having the cage head 30 for connection with the head 31 of a coupling pin 32. The coupling pin head and cage at the end of each of the screws thus form a swivel connection and these pins 32 are joined together by a length of flexible cable 33. Encasing the flexible cable 33 is a cylindrical body 34 of a suitable material for establishing a frictional engagement with the wall of the pipe 27 about which it is spirally wrapped with the cable 33, as shown in Figure 1. The cable and the body 34 which may be of rubber or of a composition containing rubber thus forms a heavy roll, which is generally indicated by the numeral 35.

In the application of the roll-like body 35 one of the screws, for example, the screw 28, is threaded into the bore 26 and the roll is passed spirally about the pipe 27 and the other screw, located near the top of the guard 23, is then passed through a suitable opening, as at 36, in the guard 23, and receives upon its outer end the spring tensioning nut 37. Between this nut and the adjacent wall of the guard 23 is a heavy coiled spring 38 which is constantly maintained under compression and exerts a constant outward pull upon the upper end of the roll which serves to tighten the convolutions of the same around the pipe. With this form of the invention, sufficient frictional contact is established between the roll and the pipe to prevent the pipe turning on its long axis independently of the guard 23 but when the pipe is shifted longitudinally the roll 35 will turn or rotate by reason of the swivel connection of the ends thereof with the screws 28 and 29 thus permitting the pipe to be fed into the well as the rotating drilling operation is carried out.

From the foregoing it will be readily apparent that there has been set forth herein a novel gripping means for a pipe comprising an element wrapped spirally thereabout which holds the pipe effectively against rotation independently of the rotary apparatus through which it passes but permits a free longitudinal movement of the pipe so that it may be fed into the well smoothly while the drilling operation is being carried out.

What is claimed is:—

1. In rotary well drilling apparatus including a rotary turntable, a gripping means for a well pipe, tube or stem passing through the table, comprising an elongated flexible element carried spirally about said pipe, tube or stem and having its ends fixed, and means forming a part of said gripping means facilitating the longitudinal movement of said pipe, tube or stem but holding the same against rotary movement independent of the table.

2. In rotary well drilling apparatus including a rotary turntable, a pipe grip comprising an elongated body having its ends fixed for rotation with the table and having its intermediate portion disposed in spirals about the pipe, and means forming a part of the body and having contact with the pipe which is rotatable on an axis extending transversely of the pipe whereby the pipe is permitted longitudinal movement but is held against rotary movement independently of the table.

3. In well drilling apparatus including a rotary table through which a pipe passes, and a guard extending above the table and enclosing a portion of the pipe, a gripping means for the pipe comprising a long body wound spirally about the pipe within the area thereof defined by the guard, means for securing one end of said member against movement, means securing the other end of the member to the guard for movement relative thereto, and means forming a part of the gripping means between the secured ends thereof constituting a rolling body engaging the pipe and permitting through rotation movement of the pipe longitudinally by holding the pipe against rotary movement independently of said table.

4. In well drilling apparatus including a rotary table through which a pipe passes, and a guard extending above the table and enclosing a portion of the pipe, a gripping means for the pipe comprising a long body wound spirally about the pipe within the area thereof defined by the guard, means for securing one end of said member against movement, means securing the other end of the member to the guard for movement relative thereto, and a plurality of rollers forming a part of said gripping means and having peripheral contact with the body of the pipe, each of said rollers being supported for rotation on an axis perpendicular to the length of the pipe.

5. In rotary well drilling apparatus including a rotary table through which a pipe passes, a guard extending upwardly from the table and surrounding the pipe, a gripping means for said pipe comprising a chain made up of a series of flexible coupled links, means for securing one end of the chain to the lower part of the guard, spring held means securing the other end of the chain to the upper part of the guard, and a roller member carried by each link and engaging the periphery of the pipe, each of said rollers being disposed on a rotary axis extending transversely of the pipe.

6. In a well drilling mechanism including a rotary table through which a pipe passes, gripping means for the pipe comprising a chain adapted to be wrapped spirally about the pipe, means for securing the chain at one end at a point adjacent the surface of the table, means for securing the other end of the chain at a substantial distance above the table, said second securing means including a spring constantly operating to draw the chain into tight contact with a pipe about which it is wrapped, said chain consisting of a plurality of flexible coupled links, and a peripherally grooved roller carried by each link on an axis extending longitudinally of the link and perpendicularly to the length of the chain encircled pipe.

7. In a well drilling machine including a rotary turntable through which a pipe passes, a gripping means for the pipe comprising an elongated flexible body consisting of a cable, a roll of friction material encircling the cable, and a coupling body swivelly connected to each end of the cable, said elongated body being adapted to be wound spirally about the pipe, means for securing one coupling body with a fixed member adjacent said table, means for securing the other coupling body to a fixed member a substantial distance above the table, and said last mentioned means including a resilient element constantly tending to draw the elongated body into tight engagement with an encircling pipe.

8. A gripping chain structure of the character set forth, comprising a plurality of link members each consisting of a pair of spaced parallel side bars, a pair of transverse bars connecting said side bars, said transverse bars being in relatively closely spaced parallel relation at the transverse centers of the side bars, a circular body rotatably supported between said transverse bars and having its periphery extending beyond the longitudinal edges of the side bars, and pivotal connecting means between said links, each of the links having the ends of the side bars thereof in overlapping relation with ends of side bars of adjacent links and said links being laterally offset in one direction successively from one end of the chain to the other whereby the links assume a stepped relation.

9. A gripping chain structure of the character set forth, comprising a plurality of link members each consisting of a pair of spaced parallel side bars, a pair of transverse bars connecting said side bars, said transverse bars being in relatively closely spaced parallel relation at the transverse centers of the side bars, a circular body rotatably supported between said transverse bars and having its periphery extending beyond the longitudinal edges of the side bars, and pivotal connecting means between said links, each of the links having the ends of the side bars thereof in overlapping relation with ends of side bars of adjacent links and said links being laterally offset in one direction whereby the links assume a stepped relation, said rotary member being in the form of a peripherally grooved roller and having its pivotal axis disposed upon the longitudinal center of the link.

R. T. MOBLEY.